(12) United States Patent
Hunnicutt et al.

(10) Patent No.: US 6,279,606 B1
(45) Date of Patent: Aug. 28, 2001

(54) MICROVALVE DEVICE HAVING A CHECK VALVE

(75) Inventors: Harry A. Hunnicutt, Ann Arbor; Paul M. Schliebe, Dexter, both of MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 09/419,557

(22) Filed: Oct. 18, 1999

(51) Int. Cl.[7] ................................................. F16R 15/00
(52) U.S. Cl. ....................... 137/543.19; 137/540; 137/538
(58) Field of Search .................................. 137/537, 538, 137/540, 543.17, 543.19, 543.21

(56) References Cited

U.S. PATENT DOCUMENTS

| | | | | |
|---|---|---|---|---|
| 886,045 | * | 4/1908 | Ehrlich | 137/540 |
| 1,886,205 | * | 11/1932 | Lyford | 137/540 |
| 1,926,031 | * | 9/1933 | Boynton | 137/540 |
| 2,412,205 | * | 12/1946 | Cook | 137/540 |
| 2,504,055 | * | 4/1950 | Thomas | 137/540 |
| 2,840,107 | * | 6/1958 | Campbell | 137/540 |
| 2,875,779 | * | 3/1959 | Campbell | 137/529 |
| 3,747,628 | * | 7/1973 | Holster et al. | 137/269 |
| 4,298,023 | * | 11/1981 | McGinnis | 137/529 |
| 5,336,062 | * | 8/1994 | Richter | 417/413.2 |
| 5,577,533 | * | 11/1996 | Cook, Jr. | 137/540 |
| 5,848,605 | * | 12/1998 | Bailey et al. | 137/540 |
| 5,873,385 | * | 2/1999 | Bloom et al. | 137/540 |

OTHER PUBLICATIONS

Marc Madou, "Fundamentals of Microfabrication", copyright 1997 by CRC Press LLC, pp. 405–446.

Ohio State University Chemistry Department brochure page on Marc J. Madou [online]. Ohio State University [retrieved on Dec. 31, 2000]. Retrieved from the Internet: <URL: http://www.chemistry.ohio-state.edu/resource/pubs/brochure/madou.htm>.

* cited by examiner

*Primary Examiner*—John Rivell
(74) *Attorney, Agent, or Firm*—MacMillan, Sobanski & Todd, LLC (57) ABSTRACT

A microvalve device for controlling fluid flow in a fluid circuit. The microvalve device includes a body defining a chamber, an inlet port and an outlet port. The inlet port is connected in fluid communication with the chamber and is adapted for connection with a first fluid source. The outlet port is connected in fluid communication with the chamber and is adapted for connection with a second fluid source. A check valve is movably disposed in the chamber for movement between a closed position and a fully opened position by differential pressure across the check valve. When the check valve is placed in the fully opened position, fluid is allowed to flow from the inlet port to the outlet port through the chamber. When placed in the closed position, the check valve restricts fluid from flowing between the inlet and outlet ports.

22 Claims, 6 Drawing Sheets

MICROVALVE DEVICE HAVING A CHECK VALVE

BACKGROUND OF THE INVENTION

This invention relates in general to microvalve devices and in particular to a microvalve device having a check valve.

The term "microvalve device", as used in this application, means a device that includes a microvalve. The term "microvalve", as used in this application, means a valve having features with sizes in the micrometer range formed at least partially by micromachining techniques. Typical micromachining techniques include conventional computer chip fabrication techniques (such as chemical etching). It should be appreciated that a microvalve device may include other components in addition to a microvalve. These additional components may be micromachined components or standard sized (larger) components.

Microvalve devices may offer significant packaging and cost advantages.

A check valve is a valve that permits fluid flow in a first direction (from an inlet port of the valve to an outlet port of the valve) and prevents fluid flow in a second direction (from the out let port to the inlet port). Generally, a check valve device has a body with a chamber defined therein. The chamber has an inlet port and an outlet port for providing fluid communication through the body to the chamber. A check valve is disposed in the chamber for movement between a closed position and a fully open position. In operation, when the fluid pressure of a first fluid source connected to the inlet port is greater than the fluid pressure of a second fluid source connected to the outlet port, the check valve is forced by the differential fluid pressure of the fluid acting across the check valve to the fully opened position. When the check valve is not in the closed position, fluid is allowed to flow from the inlet port to the outlet port through the chamber. When the fluid pressure of the first fluid source is less than the fluid pressure of the second fluid source, the check valve is forced by the differential fluid pressure acting across the check valve to move to the closed position. When moved to the closed position, the check valve restricts fluid from flowing between the inlet and outlet ports. Occasionally, a check valve device will also include an override actuator by means of which a check valve can be positioned to a position other than that to which the differential fluid pressure is urging the check valve.

An objective of this invention is to provide the function of a check valve in a microvalve device.

SUMMARY OF THE INVENTION

This invention relates to a microvalve device for controlling fluid flow in a fluid circuit. The microvalve device includes a body defining a chamber, an inlet port and an outlet port. The inlet port is connected in fluid communication with the chamber and is adapted for connection with a first fluid source. The outlet port is connected in fluid communication with the chamber and is adapted for connection with a second fluid source. A check valve is movably disposed in the chamber for movement between a closed position and a fully opened position by differential fluid pressure across the check valve. When the check valve is placed in the fully opened position, fluid is allowed to flow from the inlet port to the outlet port through the chamber. When placed in the closed position, the check valve restricts fluid from flowing between the inlet and outlet ports.

Various other objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
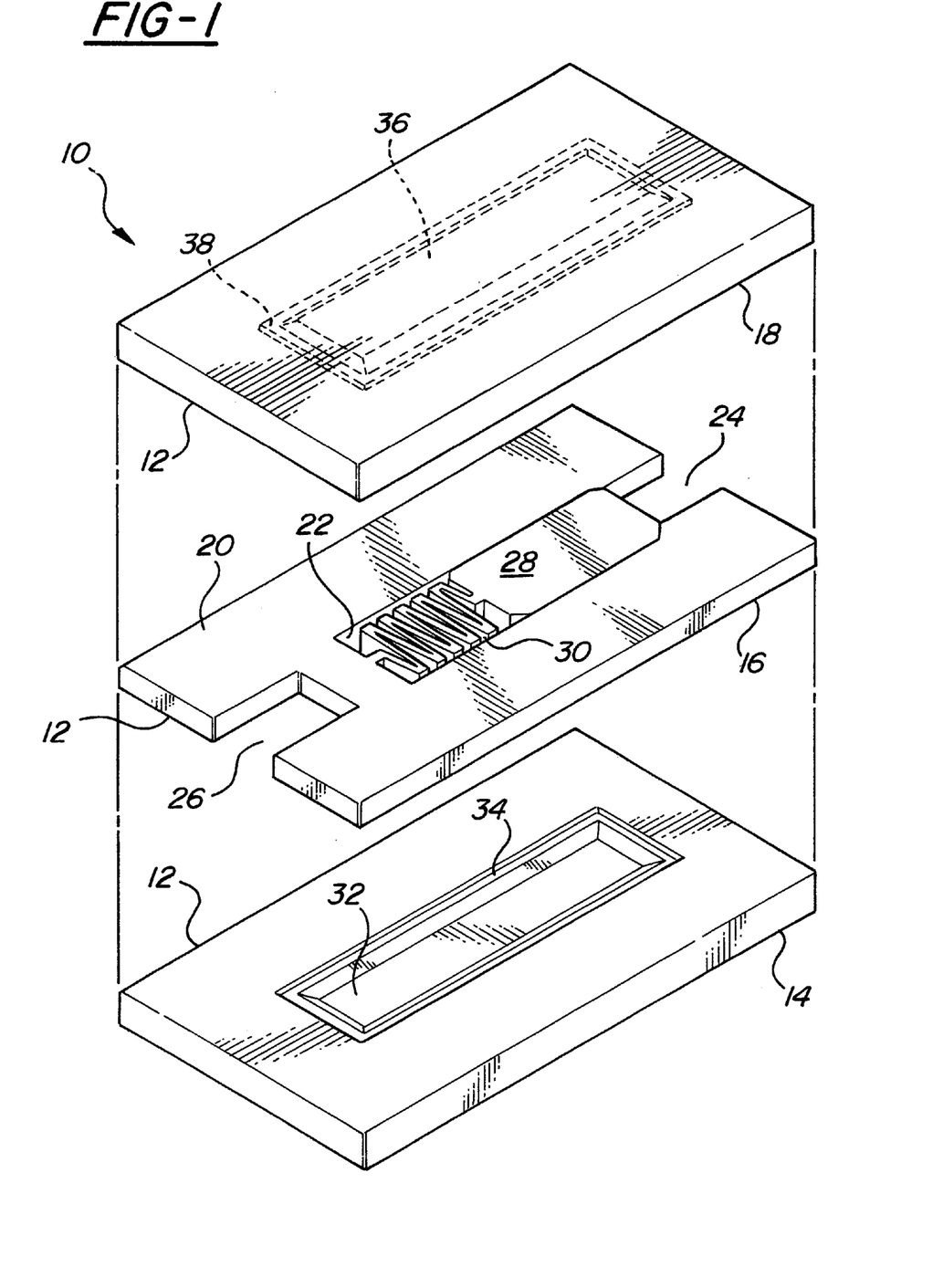
FIG. 1 is an exploded perspective view of a first embodiment of a microvalve device according to this invention, shown in a closed position.

A first embodiment of a microvalve device for controlling fluid flow in a fluid circuit is shown generally at 10 in FIG. 1. The microvalve device 10 includes a body indicated generally at 12. The body 12 includes first, second and third plates 14, 16 and 18, respectively. The second plate 16 is attached to and between the first and third plates 14, 18. Preferably, each plate 14, 16, 18 is made of a semiconductor material, such as silicon. Alternatively, any or all of the plates 14, 16, 18 may be made of any other suitable material, such as glass, ceramic, aluminum, or the like.

Figure 2A:
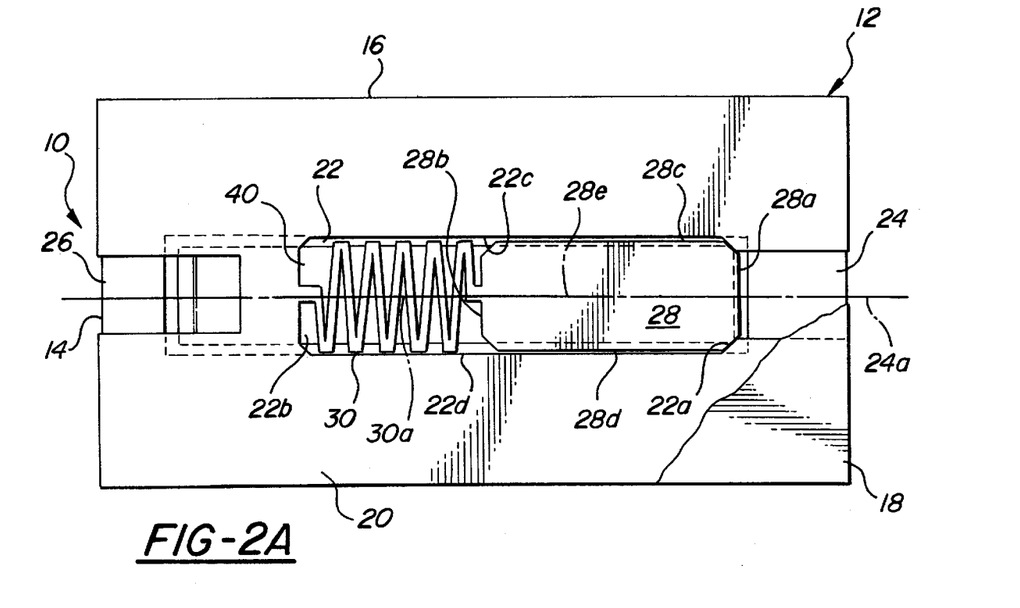
FIG. 2A is a partially broken away top plan view of the microvalve device shown in FIG. 1, illustrated in the closed position.
Figure 2B:
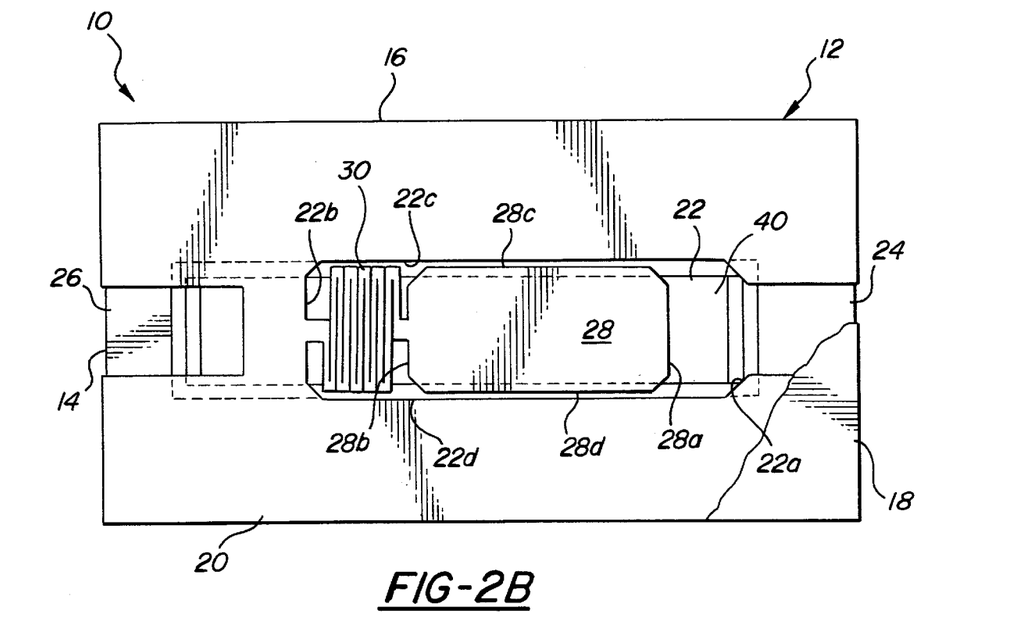
FIG. 2B is a view similar to FIGS. 2A, except with the microvalve device shown in a fully opened position.
Figure 2C:
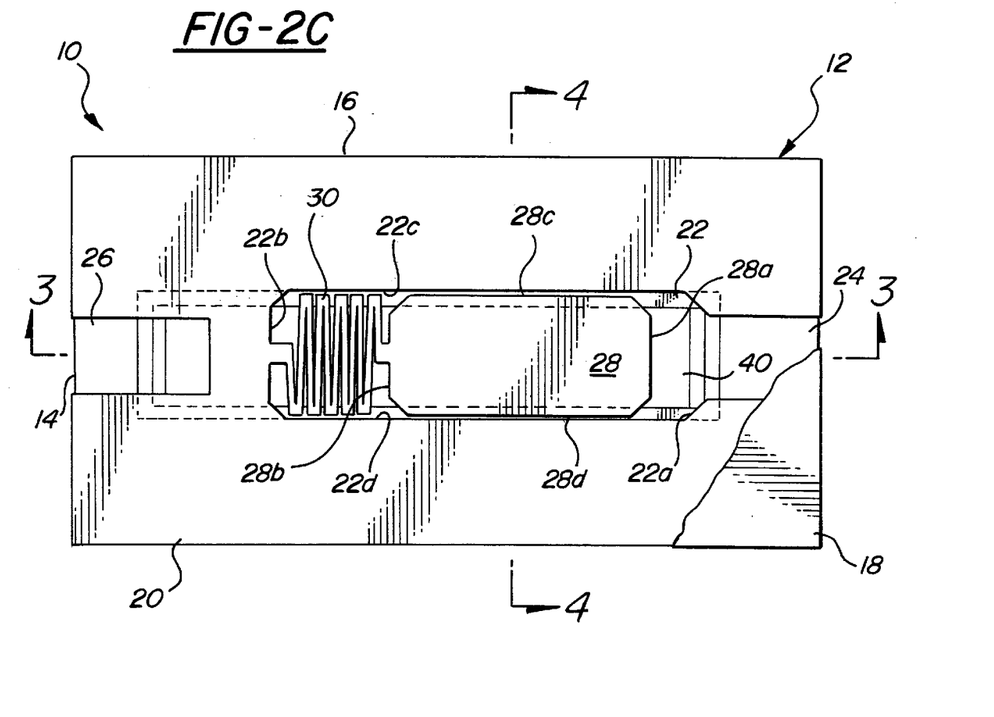
FIG. 2C is a view similar to FIG. 2A and 2B, except with the microvalve device shown in a biased position.

Referring to FIGS. 2A, 2B and 2C, the second plate 16 includes a fixed portion 20 that is fixedly attached to the first and third plates 14, 18. The fixed portion 20 defines a cavity 22 having a pair of opposed end walls 22a and 22b and a pair of opposed side walls 22c and 22d. An inlet port 24 is defined in the fixed portion 20. The inlet port 24 is adapted for connection in fluid communication with a first fluid source (not shown). The inlet port 24 is in fluid communication with the cavity 22 through the end wall 22a. Preferably, the end wall 22a extends, at an angle to a longitudinal centerline axis 24a (FIG. 2A) defined by the inlet port 24, away from each side of the junction between cavity 22 and the inlet port 24. Alternatively, the end wall 22a may be rounded, flat, or combinations of angled, rounded and flat. The end wall 22a acts a valve seat, which will be made clearer below.

An outlet port 26 is defined in the fixed portion 20. The outlet port 20 is adapted for connection with a second fluid source (not shown). As shown, the outlet port 26 is not in direct fluid communication with the cavity 22. The end wall 22b has a height substantially equal to the height of the outlet port 26. Thus, the end wall 22b blocks direct fluid communication between the cavity 22 and the outlet port 26.

The term "fluid source" as used in this application means a quantity or supply of fluid. The fluid source may have a relatively high fluid pressure, such as the discharge pressure of a running pump, in which case fluid will tend to flow from that fluid source to the respective port 24, 26. Alternatively, the fluid source may have a relatively low fluid pressure, such as the suction pressure of a running pump, in which case the fluid will tend to flow from the respective port 24, 26 to the fluid source.

A check valve 28 is movably disposed in the cavity 22 for movement between a closed position (shown in FIGS. 1 and 2A) and a fully opened position (FIG. 2B). As will be described further below, the fully opened position deviates only slightly from a biased or intermediate open position (shown in FIGS. 2C, 3 and 4). The check valve 28 is a microvalve formed as a generally rectangular member having uniform thickness with a pair of opposite end faces 28a and 28b and a pair of opposite longitudinally extending side faces 28c and 28d. The end faces 28a and 28b oppose the end walls 22a and 22b, respectively. The side faces 28c and 28d oppose the side walls 22c and 22d. A longitudinal centerline axis 28e (FIG. 2A) defined by the check valve 28 is preferably aligned with the centerline axis 24a defined by the inlet port 24. The cavity 22 and the check valve 28 are sized relative to each other such that the side walls 22c, 22d act as guides for restricting the side-to-side movement of the check valve 28. It should be understood that while the check valve 28 is shown as being generally rectangular in shape, the check valve 28 may be of any suitable shape.

The end face 28a has angled portions substantially equal to the angles of the end wall 22a. When the check valve 28 is in the closed position (shown in FIGS. 1 and 2A), the angled portions of the end face 28a engage and seat on the end wall 22a for the purpose of blocking the flow of fluid between the cavity 22 and the inlet port 24. When the check valve 28 moves out of the closed position, that is to an open position such as the biased position shown in FIGS. 2C, 3 and 4 or the fully opened position shown in FIG. 2B, the end face 28a is disengaged from the end wall 22a so as to allow fluid to flow between the cavity 22 and the inlet port 24. It should be appreciated that the end face 28a may be any shape that is complementary to the shape of the end wall 22a. Indeed, each of the end wall 22a and the end face 28a may take on any form that in combination provide the function of adequately blocking the flow of fluid between the cavity 22 and the inlet port when the check valve 28 is in the closed position. Examples of such combinations include the end wall 22a being angled, rounded or flat and the end face 28a having a portion for engaging the end wall 22a that is angled, rounded, or flat.

Figure 3:
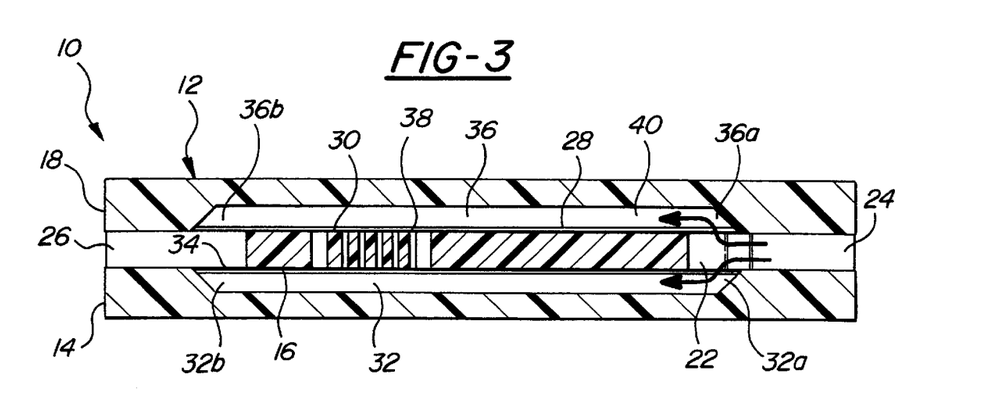
FIG. 3 is a sectional view of the microvalve device taken along the line 3—3 of FIG. 2C.
Figure 4:
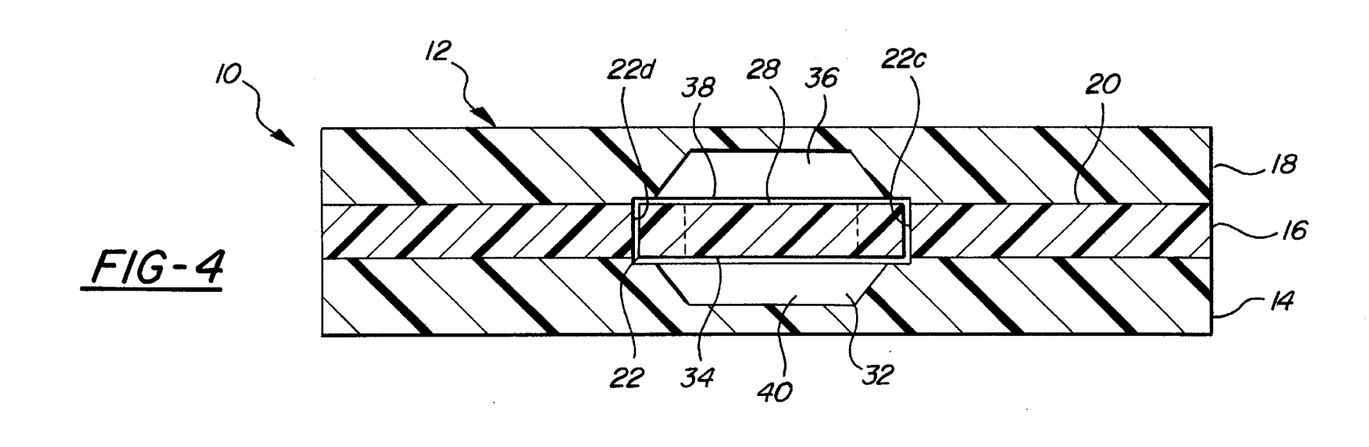
FIG. 4 is an enlarged sectional view of the microvalve device taken along the line 4—4 of FIG. 2C.

The check valve 28 is suspended in the cavity 22 by a spring 30 interconnecting the end face 28b and the end wall 22b. Preferably, a centerline axis 30a defined by the spring 30 is aligned with the longitudinal centerline axis 28e defined by the check valve 28. The fixed portion 20, the check valve 28 and the spring 30 are preferably integrally formed. Alternatively, one or both of the check valve 28 and the spring 30 may be separately formed, with the spring 30 thereafter being bonded or otherwise suitably attached to each of the check valve 28 and the fixed portion 20. Provided that the spring 30, the check valve 28 and the fixed portion 20 are integrally formed, by an etching process or similar process that removes unwanted material to form parts, the spring 30 is in a relaxed state in an "as fabricated" position, as shown in FIGS. 2C, 3 and 4. Accordingly, when displaced from the "as fabricated" position, the spring 30 biases or urges the check valve 28 to move to the biased position shown in FIGS. 2C, 3 and 4.

The spring 30 may also function as an assembly aid. Specifically, the spring 30 may provide a means for holding the check valve 28 to the fixed portion 20 while the second plate 16 is being bonded to the first and/or third plates 14, 18.

Additionally, the combination of the end wall 22b and the spring 30 acts as a stop for preventing the check valve 28 from blocking the outlet port 26. Specifically, when the check valve 28 moves away from the closed position and advances toward an open position beyond the biased position, the check valve 28 forces the spring 30 to compress. As shown in FIG. 2B, when the spring 30 reaches a fully compressed state, the spring 30 prevents further movement of the check valve 28 in the same direction. The check valve 28 is then in the fully opened position. Thus, when the check valve is in the fully opened position, the end face 28b of the check valve 28 is spaced apart from to the end wall 22b by the spring 30. By maintaining separation between the end face 28b and the end wall 22b, the check valve 28 is prevented from blocking the outlet port 26. In addition, maintaining separation between the end face 28b and the end wall 22b ensures that fluid in the cavity 22 maintains direct communication with the end face 28b, the importance of which is discussed below. It should be understood that a projection (not shown) extending from one or more of the end wall 22b, the end face 28b, the side walls 22c, 22d, the first plate 14 and the third plate 18 may act as a stop in the absence of the spring 30.

The spring 30 may also act as a guide restricting the side-to-side and up-and-down the movement of the check valve 28. By having the spring 30 act to restrict the side-to-side movement of the check valve 28, the side wall 22c, 22d may not need to act as guides, which would allow for greater clearance between the side walls 22c, 22d and the side faces 28c, 28d.

As best shown in FIGS. 1 and 3, the first plate 14 defines a pocket 32 connected in fluid communication with the cavity 22. The pocket 32 is preferably rectangular in shape. The pocket 32 and the check valve 28 are aligned with each other such that that width of the check valve 28 is approximately centered with the width of the pocket 22 (best seen in FIG. 4). The width of the pocket 32 is preferably less than the width of the check valve 28. A first end 32a of the pocket 32 is shown to terminate in advance of the junction formed by the inlet port 24 and the cavity 22. Thus, the pocket 32 does not directly communicate with the inlet port 24. A second end 32b of the pocket 32, which is at the opposite end of the pocket 32 from the first end 32a, is shown to overlap the outlet port 26. Thus, the pocket 32 is connected in direct fluid communication with both the cavity 22 and the outlet port 26. The length of the pocket 32 is preferably at least as long as the range of longitudinal motion of the check valve 28 between the closed and fully opened positions. This aspect of the pocket 32 allows fluid to flow between the inlet port 24 and the outlet port 26 under the check valve 28 through the pocket 32. In addition, by having the length of the pocket 32 be as great as the range of longitudinal motion of the check valve 28, the check valve 28 is constantly exposure to fluid in the pocket 32, the important of which is discussed below.

As shown in FIG. 4, a first recess 34 is formed in a portion of the first plate 14 directly surrounding the perimeter of the pocket 32. A surface defining the base of the recess 34 forms a ledge that is generally parallel to a bottom surface of the check valve 28 as shown in FIG. 4. The ledge of the recess 34 guides the check valve 28 in a manner to be described below.

The third plate 18 defines a pocket 36 having a first end 36a and a second end 36b. The pocket 36 is aligned with and preferably has a mirror image of the pocket 32. The pocket 36 provides a fluid path between the ports 24, 26 over the check valve 28 when the end face 28a and end wall 22a are disengaged from each other. Similarly to the pocket 32, the pocket 36 also ensures that the check valve 28 is exposed to fluid in the pocket 36.

The third plate 18 further defines a second recess 38 aligned with and having a mirror image of the first recess 34. A surface defining the base of the recess 34 forms a ledge that is generally parallel to a top surface of the check valve 28 as shown in FIG. 4. The recesses 34, 38 allow the check valve 28 to move in a fore-aft direction in an adequately free manner, while at the same time, the ledges of the recesses 34, 38 act as a secondary guide for preventing the check valve 28 from moving excessively out of the plane of the second plate 16. It is also important to note that the clearances between the check valve 28 and each ledge of the recesses 34, 38 should be small enough to sufficiently prevent fluid from the inlet port 24 from leaking past the check valve 28 when the check valve 28 is in the closed position. As such, it may be desirable for a portion of each recess 34, 38 adjacent the junction between the cavity 22 and the inlet port 24 to have a depth smaller than the remaining portion of the respective recess 34, 38.

By placing the first pocket 32 and the first recess 34 in a physical relationship to the cavity 22 and the ports 24, 26 that is substantially the same as physical relationship between the second pocket 36 and the second recess 38 and the cavity 22 and the ports 24, 26, the pressure profile of the fluid in acting in the first pockets 32 and the first recess 34 is maintained generally equal to the pressure profile of the fluid acting in the second pocket 36 and the second recess 38. By equalizing the fluid pressure profiles in the opposing pairs of pockets 32, 36 and recesses 34, 38, the fluid pressure across the check valve 28 perpendicular to the plane of the second plate 16 is balanced. By minimizing the net effect of the fluid pressure components perpendicular to the plane of the second plate 16 acting on the check valve 28, the check valve 28 will generally remain in the plane of the second plate 16, and will be subject to minimal fictional forces if the the check valve 28 does contact the first plate 14 or the second plate 16.

The pockets 32, 36, the recesses 34, 38 and the cavity 22 define a chamber 40. It should be appreciated that the body 12 may be formed from adjoining plates numbering more or less than three. Regarding these alternative embodiments, a pocket, a recess, a cavity or the like formed in one or more of the adjoining plates, may define the chamber 40.

During operation, when the force of the fluid acting on the end face 22a is equal to the force of the fluid acting on the end face 22b, the check valve 28 is biased by the spring 30 in the biased position (FIGS. 2C, 3 and 4). The biased position of the check valve 28 is an open position in which fluid is allowed to flow from the inlet port 24 under and over the check valve 28 through the respective pockets 32, 36 to the outlet port 26.

When the force of the fluid acting on the end face 22a less the force of the fluid acting on the end face 22b is greater than the force required to compress the spring 30, the check valve 28 is displaced from the biased position toward the end wall 22b. As the check valve 28 is displaced from the biased position toward the end wall 22b, the spring 30 is compressed. When the spring 30 is reaches a fully compressed state, the check valve 28 is prevented from advancing further away from the closed position and is placed in the fully opened position. When the check valve 28 is in the fully opened position, fluid flows from the inlet port 24 through the chamber 40 to the outlet port 26. By preventing the check valve 28 from advancing beyond the fully opened position, the end face 28b is prevented from engaging the end wall 22b. By preventing the end face 28b from engaging the end wall 22b, fluid is maintained between the end face 28b and the end wall 22b, which helps ensure reliable closing of the check valve 28 from the fully opened position. If the end face 28b is allowed to completely engage the end wall 22b with pressurized fluid only acting on the end face 28a, fluid would have to work its way between the end face 28b and the end wall 22b to establish fluid differential pressure across the check valve 28 to move the check valve 28 toward the closed position. Moreover, by preventing the check valve 28 from advancing beyond the fully opened position when moving from the closed position, the check valve 28 is prevented from blocking the outlet port 26 when fluid is flowing from the inlet port 24 to the outlet port 26.

When the force of the fluid acting on the end face 28b is greater than the combined force of the force of the fluid acting on the end face 22a and the force of the spring 30, the check valve 28 is displaced toward the closed position (FIGS. 1 and 2A). Having reached the closed position, the end face 28a engages the end wall 22a. When the check valve 28 is in the closed position, fluid is prevented or at least substantially restricted from flowing from the outlet port 26 to the inlet port 24. It should be noted that the force of the spring 30 is normally expected to be insubstantial compared to the fluid forces acting on the check valve 28, and thus can normally be ignored.

When the check valve 28 moves between the fully opened and closed positions, the combination of the spring 30 and the side walls 22c, 22d minimizes side-to-side movement of the check valve 28. In addition, the combination of the spring 30 and the ledges of the recesses 34, 38 minimize out-of-plane movement of the check valve 28. Minimizing side-to-side and out-of plane movement of the check valve 28 better ensures proper engagement between the end face 28a and the end wall 22a.

It should be understood that alternative means of guiding the movement of the check valve 28 may be utilized in conjunction with or in place of the guides described above. An example of such an alternative guide includes forming a rib (not shown) in each of the pockets 32, 36 that runs longitudinally through at least a portion of the respective pocket 32, 36. The height of the ribs are slightly less than the depth of the respective pocket 32, 36 so as to allow free movement of the check valve along the centerline axis 28e while restricting out-of-plane movement of the check valve 28. In working from this example, another alternative guide means includes forming grooves (not shown) in the check valve 28 complementary to the ribs formed in the pockets 32, 36. The ribs and grooves in this example are sized so that the ribs are partially disposed in grooves for the purpose of restricting side-to-side and out-of-plane movement of the check valve 28.

It should be also appreciated that the end wall 22b may be formed in a manner so that the outlet port 26 is directly connected in fluid communication with the cavity 22. An example of such an arrangement is to form a conduit (not shown) in the end wall 22b connecting the outlet port 26 in fluid communication with the cavity 22. Another example of such an arrangement is to form the end wall 22b having a thickness less than the height of the walls of the outlet port 26, thereby allowing fluid to flow over and/or under the end wall 22*b*. Regarding arrangements in which the outlet port 26 is connected directly in fluid communication with the cavity 22 (as described above), it should be understood that the second ends 32*b*, 36*b* of the pocket 32, 36 need not be connected in direct fluid communication with the outlet port 26. The advantage of connecting the cavity 22 in fluid communication with the outlet port 26 is described below.

It should be also be appreciated that the spring 30 may be replaced by a spring (not shown) disposed in the inlet port 24 and interconnecting the end face 28*a* and a wall (not shown) of the inlet port 24 opposing the end face 28*a*. Alternatively, the spring 30 may be replaced by a spring (not shown) disposed in the inlet port 24 and interconnecting the end face 28*a* and a support member (not shown) that is fixed in the inlet port 24 in a manner that allows fluid to flow between the cavity 22 and the inlet port 24. An example of such an arrangement is to form the support member as a beam that extends from one of the walls of the inlet port 24 and to make the maximum width of the spring less than the width of the inlet port 24. As such, fluid would be allowed to flow around the free end of the beam and around the spring. Another example of such an arrangement is to form such a support member as a plate having a thickness less than the height of the walls of the inlet port 24 and to keep the maximum width of the spring less than the width of the inlet port 24. In this example, fluid would be allowed to flow over and/or under the plate formed by such a support member and around the sides of the spring. Additionally, the spring 30 may be replaced by a pair of opposing springs (not shown) interconnecting one of each of the respective pairs of the side walls 22*c*, 22*d* and side faces 28*c*, 28*d*. More preferably, the opposing springs of this configuration are placed at approximately equal and opposite angles with respect to each other. As such, the force component applied laterally to the check valve 28 by one of the springs effectively cancels out the force component applied laterally to the check valve 28 by the other of the springs. By canceling out the lateral force components of the springs, a net side-to-side biasing of the check valve 28 with resultant friction forces can be minimized or eliminated.

In keeping with the last example, it may be desirable to have fluid flow from the inlet port 24 to the outlet port 26 directly through the cavity 22. One way to accomplish this is to directly connect the outlet port 26 in fluid communication with the cavity 22 through an opening in the end wall 22*b*, or by eliminating the end wall 22*b*. The thickness of the dual opposing springs could then be made less than the height of the cavity 22. As such, fluid is allowed to flow from the inlet port 24 to the outlet port 26 by flowing over and/or under the springs. It should further be understood that the springs in any of the arrangements described above may be formed as a tension or compression spring. As such, the combinations of having a tension or compression spring connected to either one of the end faces 28*a*, 28*b* and the respective end wall 22*a*, 22*b* or to one of each of the sides faces 28*c*, 28*d* and the respective side wall 22*c*, 22*d* provide that the check valve 28 may be biased in the fully opened position, the closed position or any position between the fully opened and closed positions.

Furthermore, in applications where the spring 30 is used solely as an assembly aid, the spring 30 may be replaced be a non-spring-like member or detachable tether (not shown) connected between the check valve 28 and the fixed portion 20. Preferably, the tether includes a notch or other suitable pre-stressed feature, which causes the tether to break away from the check valve 28 or the fixed portion 20 in a predetermined manner after attaching the second plate 16 to the first and third plates 14, 18 perhaps after the first application of fluid pressure to the check valve 28. The check valve 28 would then be able to freely move between closed and open positions based upon the differential fluid pressure across the check valve 28.

As described above, the microvalve device 10 can be modified so as to place the outlet port 26 in direct fluid communication with the cavity 22. In doing so, fluid is allowed to flow between the ports 24, 26 directly through the cavity 22, thereby potentially eliminating the need for the pockets 32, 36. A further example of an embodiment in which the pockets 32, 36 may be eliminated is described below.

Another embodiment of a microvalve device for controlling fluid flow in a fluid circuit is shown generally at 110 in FIGS. 5, 6A, 6B and 7. The microvalve device 110 includes a body 112 having a second plate 116 between and attached to a first plate 114 and a third plate 118 (best shown in FIGS. 5 and 7).

The microvalve device 110 is generally similar in structure and in function to the microvalve device 10, as such, features of the microvalve device 110 which are generally similar in structure and function to the microvalve 10 will have a reference number 100 more than the reference number of the corresponding feature of the microvalve device 10. The primary difference between the microvalve device 110 and the microvalve device 10 is that the body 112 of the microvalve device 110 differs from the body 12 of the microvalve 10, so as to eliminate the need for the pockets 32, 36 formed in the plates 14, 18 of the microvalve 10.

Figure 5:
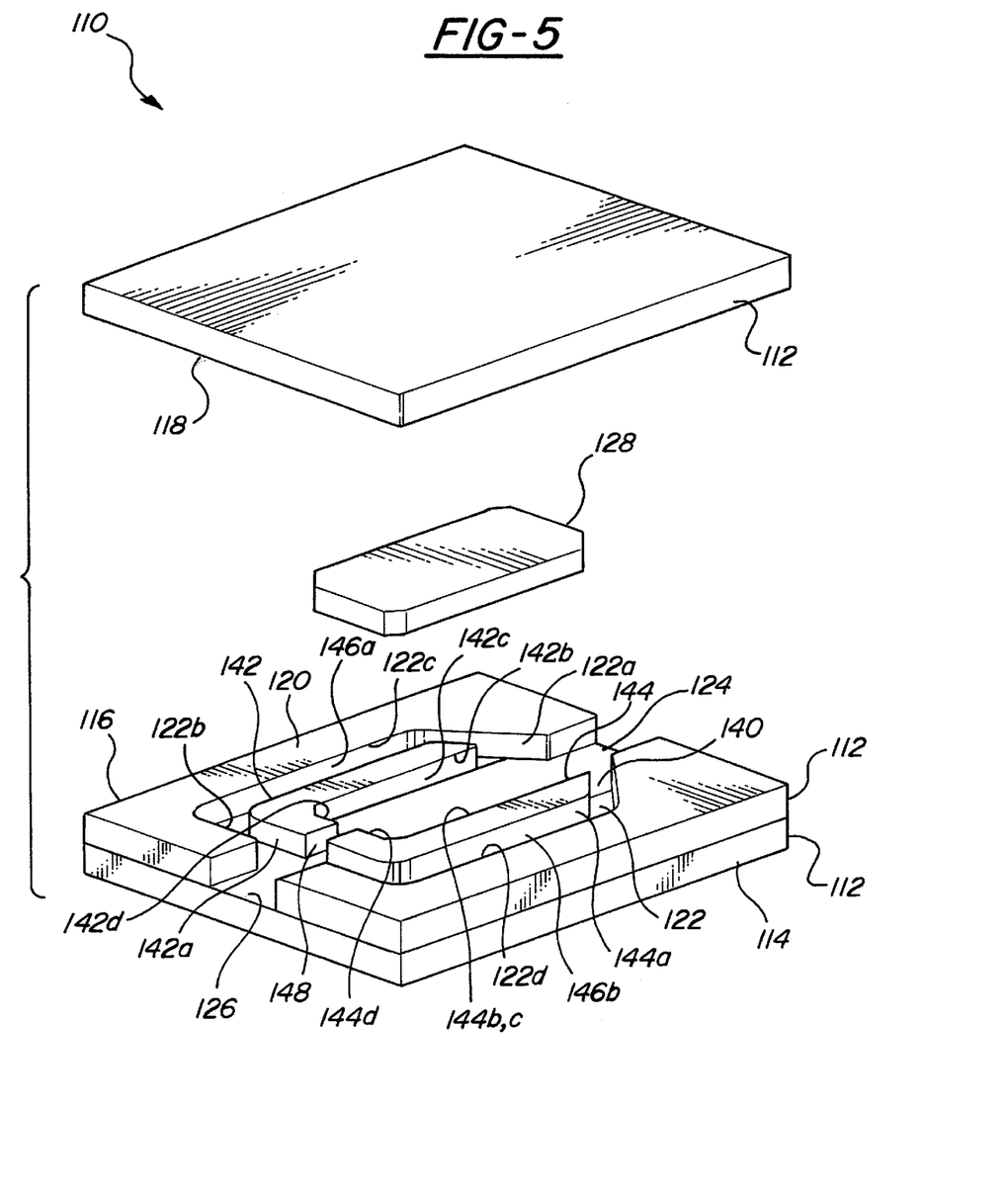
FIG. 5 is a partially exploded perspective view of an another embodiment of a microvalve device according to this invention.
Figure 6A:
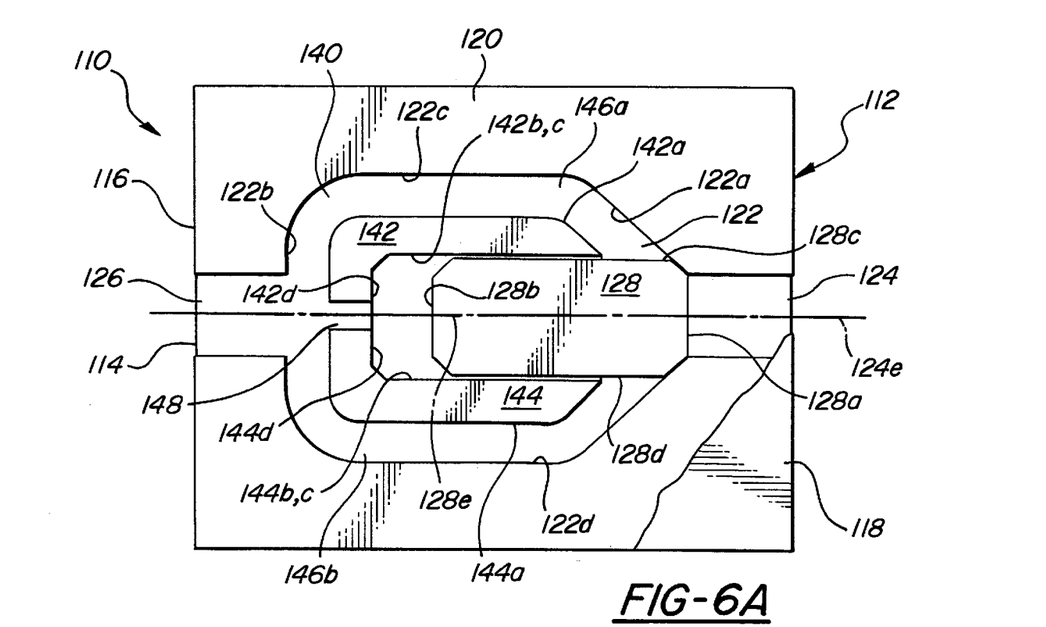
FIG. 6A is a partially broken away top plan view of the microvalve device shown in FIG. 5, shown in a closed position.
Figure 6B:
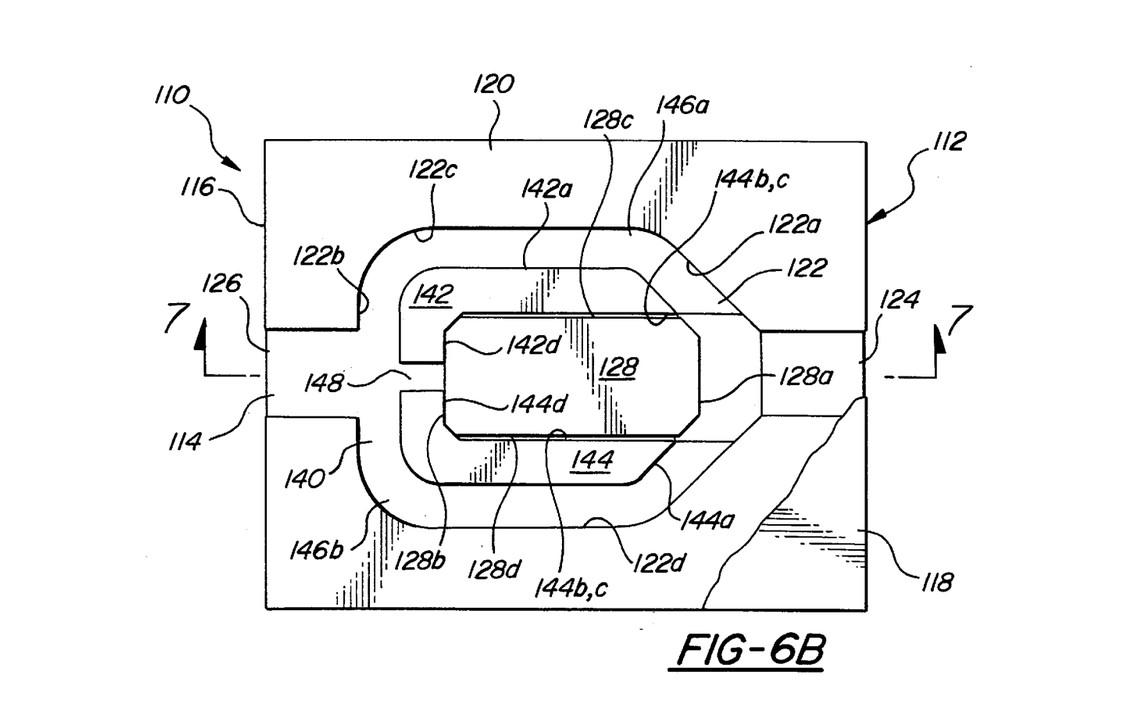
FIG. 6B is a view similar to FIG. 6A, except with the microvalve device shown in a fully opened position.

Referring to FIGS. 5, 6A and 6B, the second plate 116 includes a fixed portion 120 that is fixedly attached to the first and third plates 114, 118. The fixed portion 120 defines a cavity 122 having a pair of opposed end walls 122*a* and 122*b* and a pair of opposed side walls 122*c* and 122*d*. An inlet port 124 and an outlet port 126 are formed in the fixed portion 120. The inlet port 124 is adapted for connection in fluid communication with a first fluid source (not shown) and is connected in fluid communication with the cavity 122 through the end wall 122*a*. The outlet port 126 is adapted for connection with a second fluid source (not shown) and is connected in fluid communication with the cavity 122 through the end wall 122*b*.

A first guide member 142 is disposed in the cavity 122 and bonded to the first and third plates 114, 118. Preferably, the first guide member 142 and the fixed portion 120 are formed from the same parent material. The first guide member 142 has an outer surface 142*a* and an inner surface 142*b*. The outer surface 142*a* is preferably spaced approximately equidistantly from the side wall 122*c* and portions of the end walls 122*a*, 122*b* so as to form a first channel 146*a* between the outer surface 142*a* and the respective walls 122*a*–*c*.

A second guide member 144 is disposed in the cavity 122 and bonded to the first and third plates 114, 118. Preferably, the second guide member 144 and the fixed portion 120 are formed from the same parent material. The guide member 144 has an outer surface 144*a* and an inner surface 144*b*. The outer surface 144*a* is preferably spaced approximately equidistantly from the side wall 122*d* and portions of the end walls 122*a*, 122*b* so as to form a second channel 146*b* between the outer surface 144*a* and the respective walls 122*a*, 122*b* and 122*d*.

It should be appreciated that the perimeter of the cavity 122 and outer surfaces 142*a*, 144*a* may take on any suitable shape.

The inner surfaces 142*b* and 144*b* define side walls 142*c* and 144*c*, respectively. The side walls 142*c*, 144*c* are preferably approximately parallel to each other and are spaced approximately an equidistant in opposite directions from the centerline of the junction between the cavity 122 and the inlet port 124. The inner surfaces 142b and 144b further define end walls 142d and 144d, respectively. The end walls 142d, 144d each extend from adjacent ends of the respective guide members 142, 144 at approximately right angles to the side walls 142c, 144c. A conduit 148 is formed between the guide members 142, 144 adjacent the end walls 142d, 144d. The purpose of the conduit 148 is described below.

Figure 7:
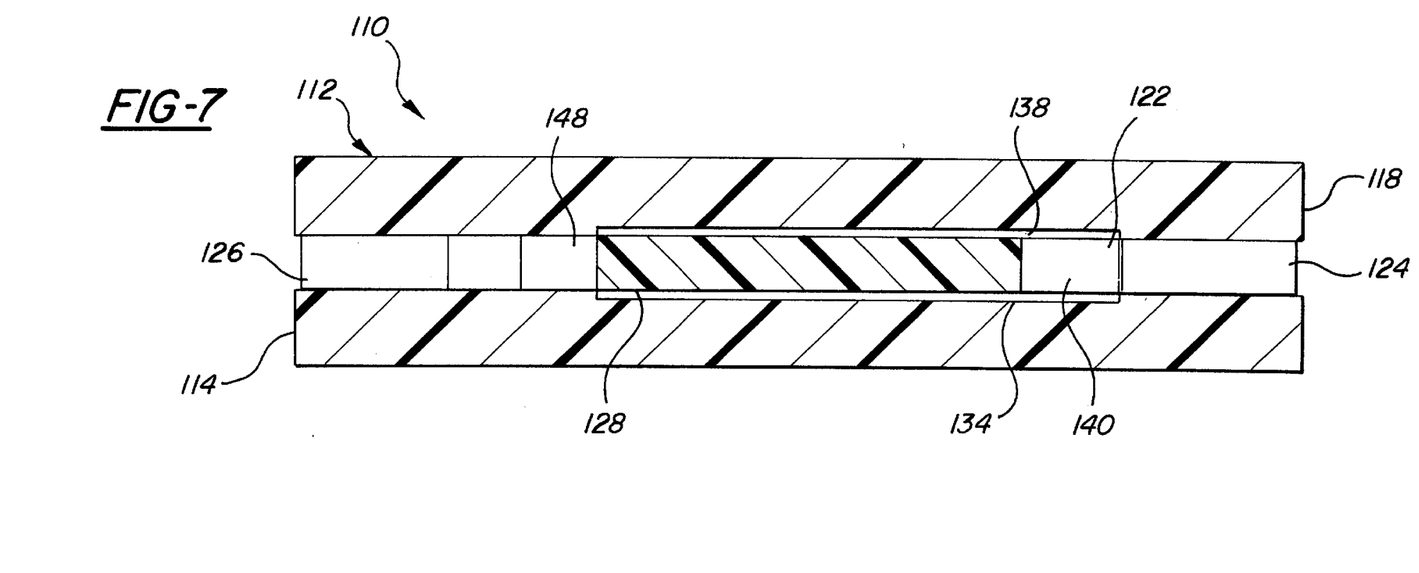
FIG. 7 is an enlarged sectional view of the microvalve device taken along the line 7—7 of FIG. 6B.

A check valve 128 is movably disposed between the side walls 142c, 144c for movement between a closed position (shown in FIG. 6A) and a fully opened position (shown in FIGS. 6B and 7). The check valve 128 has a pair of opposite end faces 128a and 128b and a pair of opposite longitudinally extending side faces 128c and 128d. When the check valve 128 is placed in the closed position, the end face 128a engages the end wall 122a for the purpose of blocking the flow of fluid between the cavity 122 and the inlet port 124. When the check valve 128 moves from the closed position toward the fully opened position, the end face 128a disengages the end wall 122a, thereby allowing fluid to flow between the ports 124, 126 through the channels 146a, 146b. When the check valve 128 is placed in the fully opened position the end face 128b engages the end walls 142d, 144d. As such, the end walls 142d, 144d act as stops for preventing the check valve 128 from advancing beyond the fully opened position. Having prevented the check valve 128 from moving beyond the fully open position, the check valve 128 is prevented from blocking the outlet port 126. The clearances between the side walls 142c, 144c and the check valve 128 are sized so that the side walls 142c, 144c act as guides for restricting side-to-side movement of the check valve 128 while allowing the check valve 128 to move sufficiently free in the longitudinal direction.

Referring to FIG. 7, the first and third plates 114, 118 define a first recess 134 and a second recess 138, respectively. The recesses 134, 138 are aligned with and are mirror images of each other. The recesses 134, 138 are designed to provide clearances between the check valve 128 and the first and third plates 114, 118 throughout the range of motion of the check valve 128 between the closed and fully opened positions. The clearances between the check valve 128 and the first and third plates 14, 16 as defined by the recesses 134, 138 are large enough to provide adequate free movement of the check valve 128 in the longitudinal direction, while at the same time are small enough to restrict out-of-plane movement to the check valve 128. Additionally, the clearances between the check valve 128 and the first and third plates 14, 16 should be small enough to sufficiently prevent fluid from the inlet port 124 from leaking past the check valve 128 when the check valve 128 is in the closed position.

In operation, when the force of the fluid acting on the end face 122a is less than the force of the fluid acting on the end face 122b, the fluid differential pressure moves the check valve 128 to the closed position. When the force of the fluid acting on the end face 122a is greater than the force of the fluid acting on the end face 122b, the fluid differential pressure moves the check valve 128 to the fully opened position. The conduit 148 exposes the end face 122b to fluid in the cavity 122 so that the check valve 128 is always subjected to the differential pressure between the inlet port 124 and the outlet port 126. When moving between the closed and fully opened positions, the side walls 142c, 144c and the first and third plates restrict, respectively, the side-to-side movement and the out-of-plane movement of the check valve 128.

The microvalve devices 10, 110 according to this invention may be used in conjunction with a variety of fluid circuits, such as vehicle brake systems. These fluid circuits may include other microvalve devices, such as the microvalve devices described in United States patent application Ser. No. 09/148,026, filed Sep. 3, 1998, the disclosure of which is incorporated herein by reference. It should be appreciated that the microvalve devices 10, 110 according to this invention may be fabricated using micromachining techniques similar to the micromaching techniques associated with the microvalve devices described in the above-incorporated reference. It should be further appreciated that the microvalve devices 10, 110 according to this invention may be formed integrally with other microvalve devices such as the microvalve devices described in the above-incorporated reference.

It is also anticipated that the microvalve devices 10, 110 may be modified to include an override actuator (not shown) which can be selectively actuated to position the check valve 28, 128 thereof irrespective of fluid differential force acting across the check valve 28, 128 and which may be de-actuated to allow the check valve 28, 128 to be positioned by fluid differential force acting across the check valve 28, 128 as described above.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A microvalve device for controlling fluid flow comprising:

a body defining a chamber, an inlet port and an outlet port therein, each said port being in fluid communication with said chamber; and a micromachined check valve disposed in said chamber between said ports for sliding movement by differential pressure across said check valve between a closed position in which fluid flow between the ports is restricted and an opened position in which fluid flow between the ports is allowed.

2. The microvalve device according to claim 1 including a stop for preventing said check valve from advancing beyond a fully opened position when said check valve moves from said closed position to said opened position.

3. The microvalve device according to claim 2 wherein said stop includes a spring interconnecting said body and said check valve.

4. The microvalve device according to claim 2 wherein said stop includes an end wall fixed to said body and disposed in said chamber, said end wall and said check valve being spaced apart from each other when said check valve is in said closed position, said end wall and said check valve engaging each other when said check valve is in said fully opened position.

5. The microvalve device according to claim 1 including a guide engaging said check valve so as to guide said check valve during movement of said check valve between said closed position and said opened position.

6. The microvalve device according to claim 5 wherein said guide includes a spring interconnecting said body and said check valve, said spring restricting the side-to-side and out-of-plane movement of the check valve.

7. The microvalve device according to claim 5 wherein said guide includes a pair of recesses formed in said body and defining portion of said chamber, said check valve being disposed in between said recesses, said recesses defining a base surface for restricting the out-of-plane movement of said check valve while allowing longitudinal movement of said check valve.

8. The microvalve device according to claim 5 wherein said guide includes a pair of opposing side walls defined by said body said check valve being disposed between said side walls, said side walls restricting the side-to-side movement of said check valve while allowing longitudinal movement of said check valve.

9. The microvalve device according to claim 8 wherein said side walls define a portion of said chamber.

10. The microvalve device according to claim 8 wherein said side walls are disposed in said chamber.

11. The microvalve device according to claim 10 wherein at least one of said side walls includes an outer surface, said outer surface being spaced apart from the perimeter of said cavity so as to form a channel between said outer surface and the perimeter of said cavity, whereby fluid flows from said inlet port to said outlet port through said channel when said check valve is placed in said fully opened position.

12. The microvalve device according to claim 1 wherein said body includes a first plate, a second plate and a third plate, said second plate having a fixed portion between and secured to said first plate and said third plate.

13. The microvalve device according to claim 12 wherein said fixed portion defines a cavity, said cavity being at least a portion of said chamber, said check valve being disposed in said cavity.

14. The microvalve device according to claim 12 wherein said fixed portion further defines at least one of said ports.

15. The microvalve device according to claim 12 wherein at least one of said first plate and said third plate defines a recess, said recess being a portion of said chamber and having a base surface with a length approximately equal the range of movement of said check valve between said closed position and said fully opened position, whereby said base surface restricts out-of-plane movement of said check valve while allowing longitudinal movement of said check valve.

16. The microvalve device according to claim 12 wherein at least one of said first plate and said third plate defines a pocket, said pocket being a portion of said chamber and having a length at least equal the range of movement of said check valve between said closed position and said fully opened position, whereby fluid is allowed to flow between said ports through said pocket when said check valve moves from said closed position toward said fully opened position.

17. The microvalve device according to claim 16 wherein one of said first plate and said third plate defining said pocket further defines a recess defining a portion of said chamber and directly surrounding said pocket, said recess having a base surface for restricting out-of-plane movement of said check valve while allowing longitudinal movement of said check valve.

18. The microvalve device according to claim 16 wherein said pocket is in indirect fluid communication with said inlet port whereby when said check valve is in said closed position said check valve substantially restricts fluid flow from between said inlet port and said pocket.

19. The microvalve device according to claim 17 wherein said pocket is connected in direct fluid communication with said outlet port.

20. The microvalve device according to claim 12, wherein said fixed portion of said second plate forms one piece with said check valve, which is movable relative thereto.

21. The microvalve device according to claim 20, wherein said fixed portion of said second plate and said check valve are interconnected by a spring which, like said fixed portion of said second plate and said check valve, is an integral part of said second plate.

22. The microvalve device according to claim 12, wherein said fixed portion of said second plate and said check valve form unconnected parts of said second plate.

* * * * *

UNITED STATES PATENT AND TRADEMARK OFFICE
CERTIFICATE OF CORRECTION

PATENT NO. : 6,279,606 B1
DATED : August 28, 2001
INVENTOR(S) : Harry A. Hunnicutt et al.

It is certified that error appears in the above-identified patent and that said Letters Patent is hereby corrected as shown below:

<u>Column 11, claim 7,</u>
Line 3, after "defining" insert -- a --.

Signed and Sealed this

Twenty-sixth Day of February, 2002

Attest:

JAMES E. ROGAN
*Attesting Officer*     *Director of the United States Patent and Trademark Office*